(12) United States Patent
Sharp

(10) Patent No.: US 7,020,840 B2
(45) Date of Patent: Mar. 28, 2006

(54) RELATING TO BRAILLE EQUIPMENT

(75) Inventor: Jonathan Paul Sharp, Christchurch (NZ)

(73) Assignee: Pulse Data International Limited, Christchurch (NZ)

( * ) Notice: Subject to any disclaimer, the term of this patent is extended or adjusted under 35 U.S.C. 154(b) by 684 days.

(21) Appl. No.: 09/817,364

(22) Filed: Mar. 22, 2001

(65) Prior Publication Data

US 2002/0138521 A1 Sep. 26, 2002

(51) Int. Cl.
*G06F 17/21* (2006.01)

(52) U.S. Cl. ............... 715/523; 715/530; 434/113; 434/114; 704/271; 341/27

(58) Field of Classification Search ............... 715/530; 704/271; 434/114, 113; 341/27
See application file for complete search history.

(56) References Cited

U.S. PATENT DOCUMENTS 4,985,692 A * 1/1991 Breider et al. ........... 340/407.2
5,186,629 A * 2/1993 Rohen ..................... 434/114
5,580,251 A * 12/1996 Gilkes et al. ............ 434/113
5,583,478 A * 12/1996 Renzi ...................... 341/27
6,230,135 B1 * 5/2001 Ramsay et al. .......... 704/271

OTHER PUBLICATIONS

Kieninger, Thomas G., "The 'Growing Up' of HyperBraille—an office workspace for blind people," Symposium on User Interface Software and Technology @Seattle, Washington (pp. 67-73; ACM Press, © 1996).*

* cited by examiner

Primary Examiner—Doug Hutton
(74) Attorney, Agent, or Firm—Dennison, Schultz, Dougherty & MacDonald

(57) ABSTRACT

A apparatus and method are provided which assist the use of electronic documents in both a word processor (17) and Braille environment (16). The apparatus and methods facilitate conversion of electronic documents between various formats for subsequent use on word processor equipment (15) and Braille equipment (10) as required. The translation utilizes a temporary file (90, 91) in an intermediary format which retains formatting information relating the manner in which the document should be rendered in each environment (16,17). The transfer of electronic documents is transparent to the user in a manner that it appears only one document is being worked with.

33 Claims, 11 Drawing Sheets

Figure 1:
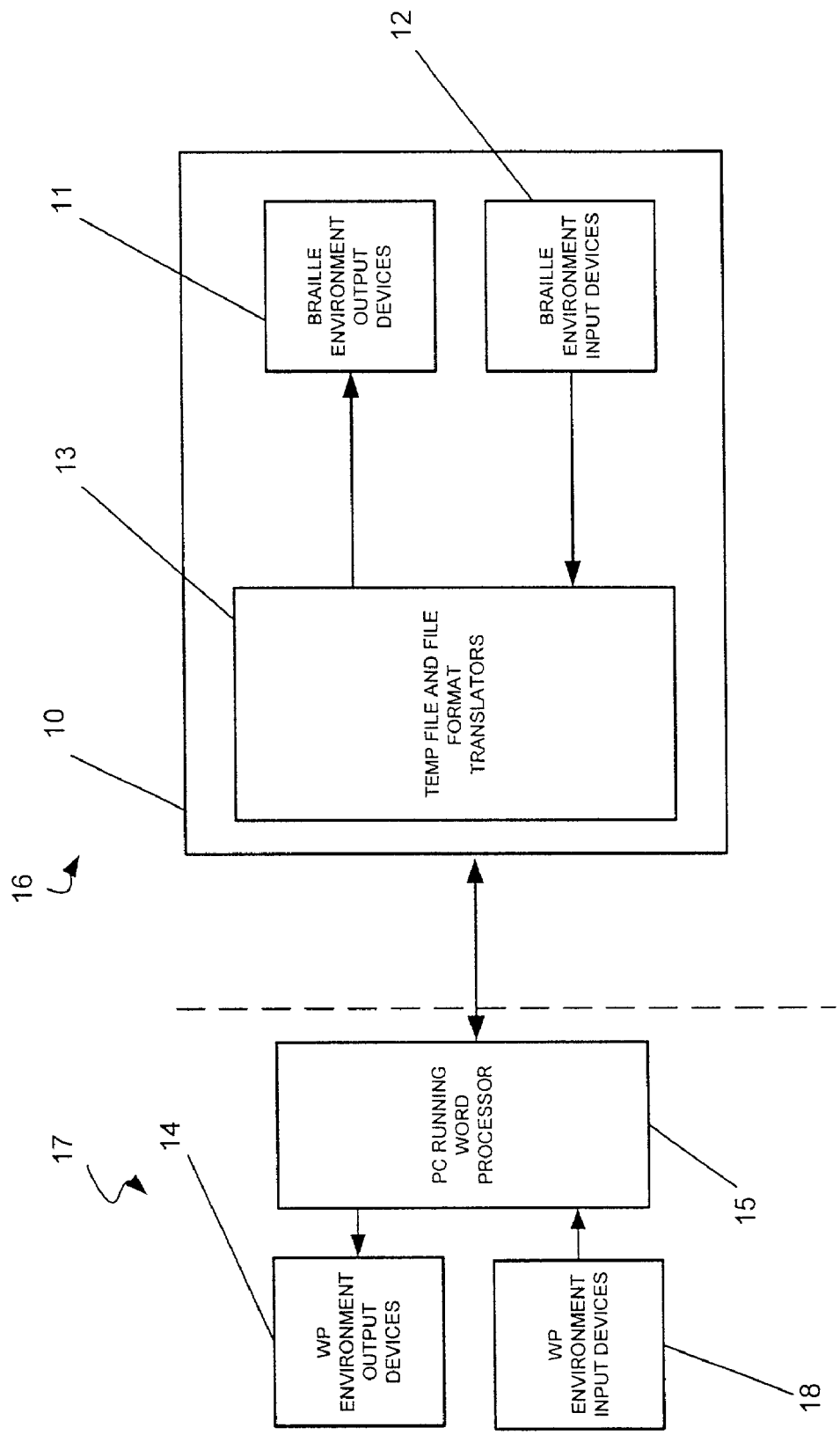

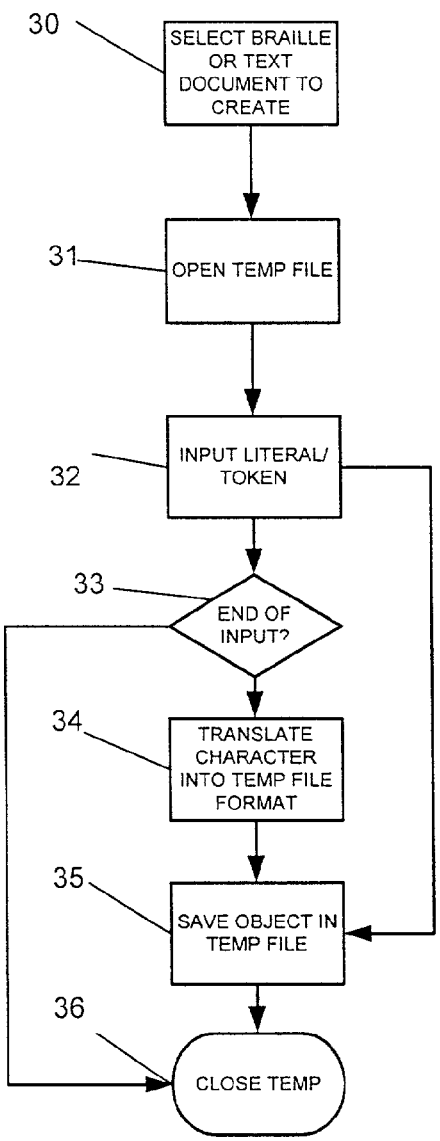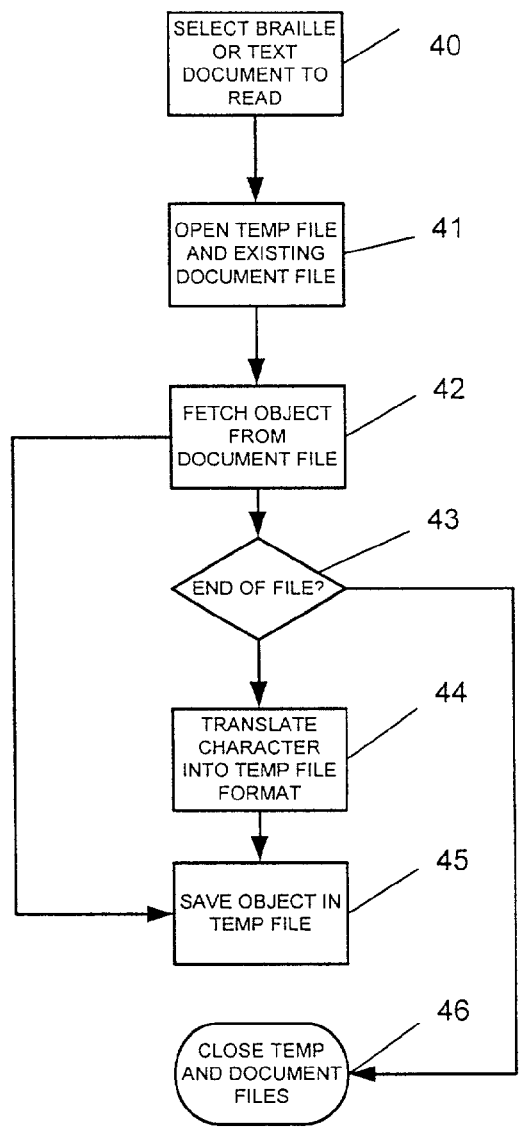
FIGURE 3
FIGURE 4

RELATING TO BRAILLE EQUIPMENT

FIELD OF THE INVENTION

This invention relates to apparatus and methods which assist the use of electronic documents in both Braille and word processor environments. In particular it relates to apparatus and methods which facilitate conversion of electronic documents between various formats for subsequent use on word processor equipment and Braille equipment as required.

BACKGROUND TO THE INVENTION

Braille is a literary medium designed to assist visually impaired people to communicate in a written form. Standard Braille is based on tactile symbols each comprising combinations of up to six dots on a 2 by 3 matrix which can be embossed onto paper, each symbol relating to a character. Original Braille embossers comprised mechanical devices with six keys each relating to one of the six dots. A Braille page typically has up to 40 Braille symbols per line and 25 lines per page.

In some languages, for example in English, French and German, there are two grades of Braille. In Grade 1 each letter of the standard alphabet translates directly to a Braille symbol which is formed by the array of 2×3 dots, sometimes referred to as a Braille cell. There are special symbols and combinations of symbols for capitalisation, punctuation, numerals and so forth. Grade 2 Braille comprises grade 1 and, in English, 189 contractions. For example the Grade 1 symbol for the letter "b" becomes "but" if it is preceded and followed by spaces. Similarly "k" becomes "knowledge". Special symbols exist for the common letter groups such as "ed," "ch", "gh" and so on.

In addition to being embossed onto paper, Braille may be created and stored electronically and displayed on a refreshable Braille display. The Braille display is similar to a short line of embossed Braille and is read in the same manner. Electronic Braille displays are comprised of cells with the same pattern of dots as embossed Braille. Modern electronic Braille displays comprise a linear array of up to 80 identical Braille cells using piezzo-electric crystals. Each dot of each cell is actuated by a piezo electronic crystal that bends up to raise a pin (dot present) or bends down to lower the pin (dot absent). To facilitate use of Braille in computer environments, computer Braille has been developed in both six and eight dot versions. For the eight dot version two extra dots are arranged with the standard size dots in a 2 by 4 pattern to represent additional characters used in computer environments, for example the ASCII character set. The extra dots are associated with two more keys on the Braille keyboard.

Braille notetakers are portable electronic devices which assist visually impaired people to create, manage and exchange information in a manner similar to those people who use standard personal digital assistants (PDAs). A typical Braille notetaker provides applications such as a word processor, address list, day planner, phone book and the like, and has various input and output devices for operating the software, for example, a Braille keyboard, standard keyboard, tactile Braille display and synthesised voice output. Documents created using these applications can be edited, printed, emailed and saved as required.

Often a user of a Braille notetaker needs to exchange documents with users of standard word processing programs operating on computers or PDAs. Such documents however do not translate well between the two environments as much of the document formatting, such as page layout, character attributes and the like is lost. For example a Braille document has a standard layout which differs from that of documents created and saved using well known word processors such as Microsoft Word™ or WordPerfect™. The rich text of such a word processor document, along with layout features such as tables and tabs are also lost in translation. Further, documents created in one of the environments are always not suitable for use in the other environment. For example special features which are provided in a document by a Braille notetaker to assist visually impaired people to use the document are lost in translation to a word processor format. It would be desirable therefore to have a notetaker which assist the use of electronic documents in both a Braille and word processor environment.

SUMMARY OF THE INVENTION

It is an object of the present invention to effect transfer of an electronic document between various formats to enable use of the document in both a Braille environment and a word processor environment. Preferably the electronic document is transferred between formats in a manner which is transparent to the user such that it appears only one document is being worked with.

The term "Braille environment" broadly refers to the Braille types and formatting conventions which specify the nature of Braille symbols and documents, and the equipment utilised to create, edit, save and review both electronic and hardcopy Braille documents. The term "word processor environment" broadly refers to the hardware and software, such as a PC running a word processor like MicroSoft Word™, used to create, edit and review standard electronic text documents, and the file formats used to store such documents.

In one aspect the present invention may be said to consist in a method for converting an electronic document interchangeably between a format for use in a Braille environment and a format for use in a word processor environment including:

receiving input in a first of the environments specifying the electronic document, storing the electronic document in an intermediary file format, and converting the electronic document from an intermediary file format into destination file format adapted for editing in the second of the environments, wherein the intermediary format specifies the document formatting in at least one of the environments.

Preferably transferring the document to an apparatus adapted for operation in the second of the environments.

Preferably rendering the electronic document in the second of the environments in accordance with the specified formatting.

Preferably editing the electronic document formatting for one of the environments.

Preferably editing the electronic document in one of the environments does not affect formatting of the rendered electronic document in the other of the environments.

Preferably the input is received in a Braille environment from a Braille keyboard, standard keyboard or a stored computer file.

Preferably the destination format is adapted for use in a word processor environment.

Preferably the input is received in a word processor environment from a standard keyboard or a stored computer file.

Preferably the destination format is adapted for use in a Braille environment.

Preferably the destination format is compatible with word processing equipment to assist in creating, editing, rendering and/or printing a text document.

Preferably the destination format is compatible with Braille equipment to assist in creating, editing, rendering and/or embossing a Braille document.

Preferably the destination format for use in a Braille environment specifies the electronic document for rendering in grade 1, 2 or computer Braille.

Preferably the destination format for use in a word processor environment specifies the electronic document for presentation on a word processor.

Preferably said method further comprising transmitting the document to another computer.

Preferably the electronic document formatting is specified by codes indicating page layout, character attributes and the like.

In a second aspect the present invention may be said to consist in a method for converting an electronic document interchangeably between a format for use in a Braille environment and a format for use in a word processor environment including:

receiving input specifying an electronic document from an input device operating in the Braille environment, storing the electronic document in an intermediary file format which specifies the electronic document formatting in both the Braille environment and the word processor environment, converting the electronic document from the intermediary file format into a word processor file format, and transferring the electronic document in the word processor format to equipment operating in the word processor environment, wherein the document formatting for each environment is stored independently in the intermediary format to enable independent editing of the document formatting for each environment.

In a third aspect the present invention may be said to consist in a method for converting an electronic document interchangeably between a format for use in a Braille environment and a format for use in a word processor environment including:

receiving input specifying an electronic document from an input device operating in the word processor environment, storing the electronic document in an intermediary file format which specifies the electronic document formatting in both the Braille environment and the word processor environment, converting the electronic document from the intermediary file format into a Braille file format, and transferring the electronic document in the Braille format to equipment operating in the Braille environment, wherein the document formatting for each environment is stored independently in the intermediary format to enable independent editing of the document formatting for each environment.

In a fourth aspect the present invention may be said to consist in an apparatus which enables use of an electronic document in a Braille and a word processor environment including:

at least one document input device in a first of the environments for entering an electronic document into the apparatus, a storage device for storing the electronic document in an intermediary file format, and translator for converting the electronic document from the intermediary file format into a destination file format for use in the second of the environments, wherein the intermediary file format specifies the document formatting in at least one of the environments.

Preferably said method further comprising an input device for editing the electronic document formatting for each of the environments.

Preferably editing the document formatting for one of the environments does not affect document formatting for the other environment.

Preferably said method further comprising a telecommunications port for transferring the document to another apparatus.

Preferably the second of the environments is a word processor environment and the destination format is adapted for compatibility with word processor equipment.

Preferably the second of the environments is a Braille environment and the destination format is adapted for compatibility with Braille equipment.

Preferably the format for use in a Braille environment specifies information for rendering the document in grade 1, 2 or computer Braille.

Preferably the document formatting is specified by codes indicating page layout, character attributes and the like.

Preferably said method further comprising an output device for rendering the electronic document in a visual, tactile or audible manner.

In a fifth aspect the present invention may be said to consist in an apparatus which enables use of an electronic document interchangeably between a Braille and a word processor environment including:

at least one document input device operating in the Braille environment for entering an electronic document into the apparatus, a storage device for storing the electronic document in an intermediary file format which specifies the electronic document formatting in both the Braille environment and the word processor environment, a translator for converting the electronic document from the intermediary file format into a word processor file format compatible for use with word processor equipment operating in the word processor environment, a communication device for transferring the document between the storage device and the word processor equipment, and an editing device for editing the electronic document formatting for each of the environments, wherein the document formatting for each environment is stored independently in the intermediary file format to enable independent editing of the document formatting for each environment.

In a sixth aspect the present invention may be said to consist in an apparatus which enables use of an electronic document interchangeably between in a Braille and a word processor environment including:

at least one document input device operating in the word processor environment for entering an electronic document into the apparatus, a storage device for storing the electronic document in an intermediary file format which specifies the electronic document formatting in both the Braille environment and the word processor environment, a translator for converting the electronic document from the intermediary file format into a Braille file format compatible for use with Braille equipment operating in a Braille environment, a communication device for transferring the document between the storage device and the Braille equipment, and an editing device for editing the electronic document formatting for each of the environments, wherein the document formatting for each environment is stored independently in the intermediary format to enable independent editing of the document formatting for each environment.

In a seventh aspect the present invention may be said to consist in an apparatus which enables use of an electronic document interchangeably between in a Braille and a word processor environment including:

at least one document input device operating in the word processor environment for entering an electronic document into the apparatus, a storage device for storing the electronic document in an intermediary file format which specifies the electronic document formatting in both the Braille environment and the word processor environment, a translator for converting the electronic document from the intermediary file format into a Braille file format compatible for use with Braille equipment operating in a Braille environment, a communication device for transferring the document between the storage device and the Braille equipment, and an editing device for editing the electronic document formatting for each of the environments, wherein the document formatting for each environment is stored independently in the intermediary format to enable independent editing of the document formatting for each environment.

In a seventh aspect the present invention may be said to consist in a device for use of an electronic document between at least two environments, at least one of said environments being a Braille environment or a word processor environment including:

means for receiving input, in either of the environments, which specifies the electronic document;

means for storing the document electronically in an intermediary file format, which preserves all the content of the document including but not limited to, information content, document presentation content, and content conditional on the environment in which it is being used;

means for converting the document from the intermediary file format into a destination file format adapted for storing, reviewing or editing in one of the environments, including that content which is conditional on that environment.

Preferably said method further comprising means for reviewing the document content in either of the environments, including that content which is conditional on either environment, Preferably said method further comprising means for editing the document content, in either of the environments, including that content which is conditional on either environment, In an eighth aspect the present invention may be said to consist in device for use of an electronic document interchangeably between at least two environments, at least one of said environments being a Braille environment or a word processor environment including:

means for receiving input, in either of the environments, which specifies the electronic document;

means for storing the document electronically in an intermediary file format, which preserves all the content of the document including but not limited to, information content, document presentation content, and content conditional on the environment in which it is being used;

means for converting the document from the intermediary file format into a destination file format adapted for storing, reviewing or editing in one of the environments, including that content which is conditional on that environment.

In a ninth aspect the present invention may be said to consist in a device for specifying an electronic document for use in a Braille environment and for use in a word processor environment including:

means for receiving input, in either of the environments, which specifies the document, means for storing the document electronically in an intermediary file format, which preserves all the content of the document as independent objects, means for reviewing the document content in either of the environments, including that content which is conditional on either environment, means for editing the document content, in either of the environments, including that content which is conditional on either environment, means for converting the document from the intermediary file format into a destination file format adapted for storing, reviewing or editing in only one of the environments, wherein the intermediary file preserves and specifies the document including but not limited to, information content, document presentation content, and content conditional on the environment in which it is being used.

In another aspect the present invention may be said to consist in an apparatus which enables use of an electronic document in a Braille and a word processor environment including: at least one document input device in a first of the environments for entering an electronic document into the apparatus, a storage device for storing the electronic document in an intermediary format, and translator for converting the electronic document from the intermediary format into a destination format for use in the second of the environments, wherein the intermediary format specifies the electronic document formatting in at least one of the environments.

The invention may also be said to consist in any alternative combination of parts or features as described or shown in the accompanying drawings. Known equivalents of these parts or features not expressly set out are nevertheless deemed to be included.

BRIEF LIST OF FIGURES

Figure 2:
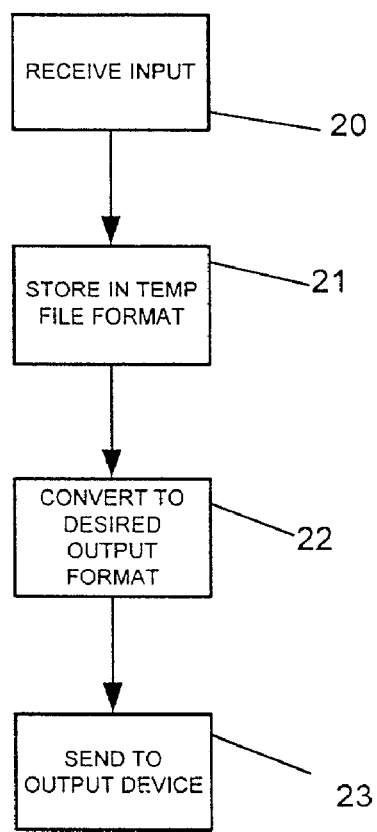
Figure 5:
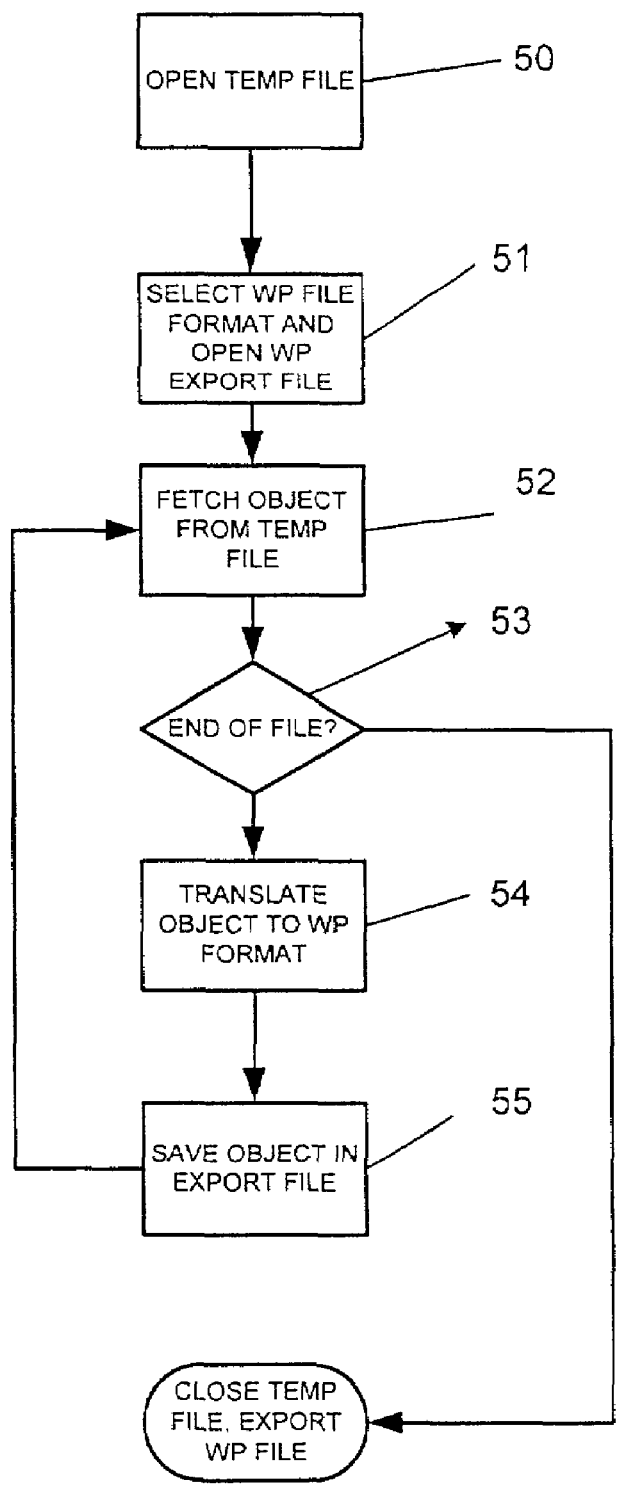

Preferred embodiments of the invention will be described with reference to the accompanying drawings, in which:

FIG. 1 is a schematic diagram showing a general arrangement of apparatus for facilitating the transfer of electronic documents between a word processing and Braille environment, FIG. 2 is a flow diagram showing the general operation of apparatus for facilitating electronic document transfer, FIGS. 3 and 4 are flow diagrams showing preferred methods of converting an electronic document into an intermediary format, FIG. 5 is a flow diagram showing a preferred method of translating an electronic document from an intermediary format to a word processor format.

Figure 9A:
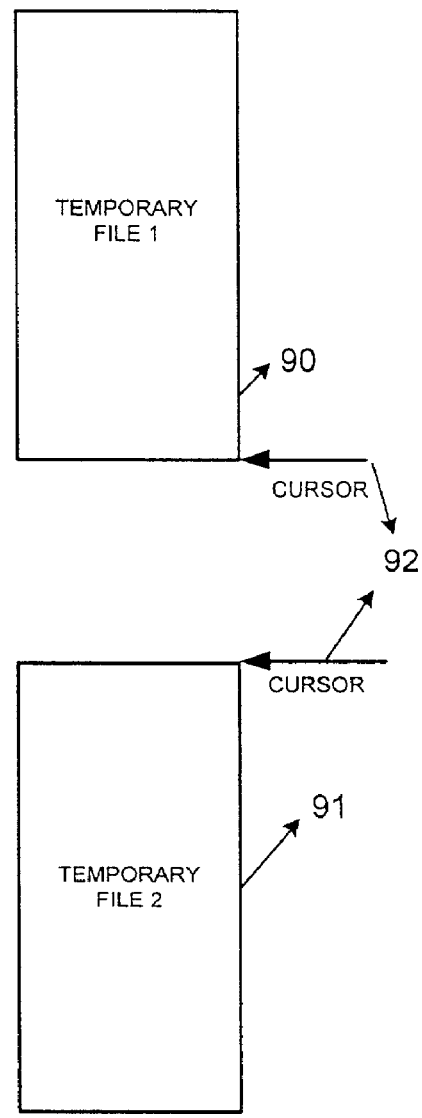
Figure 6:
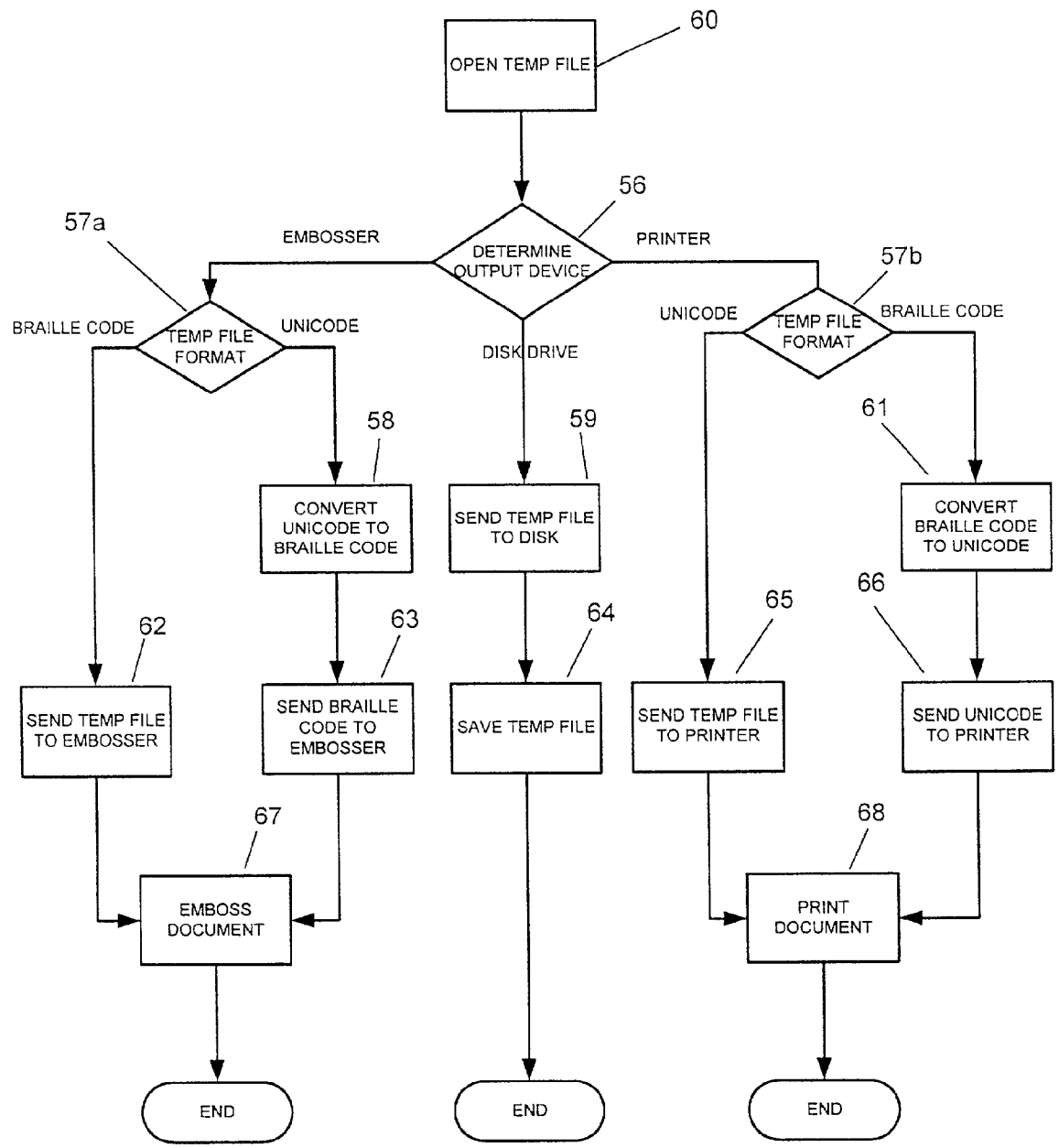
Figure 7:
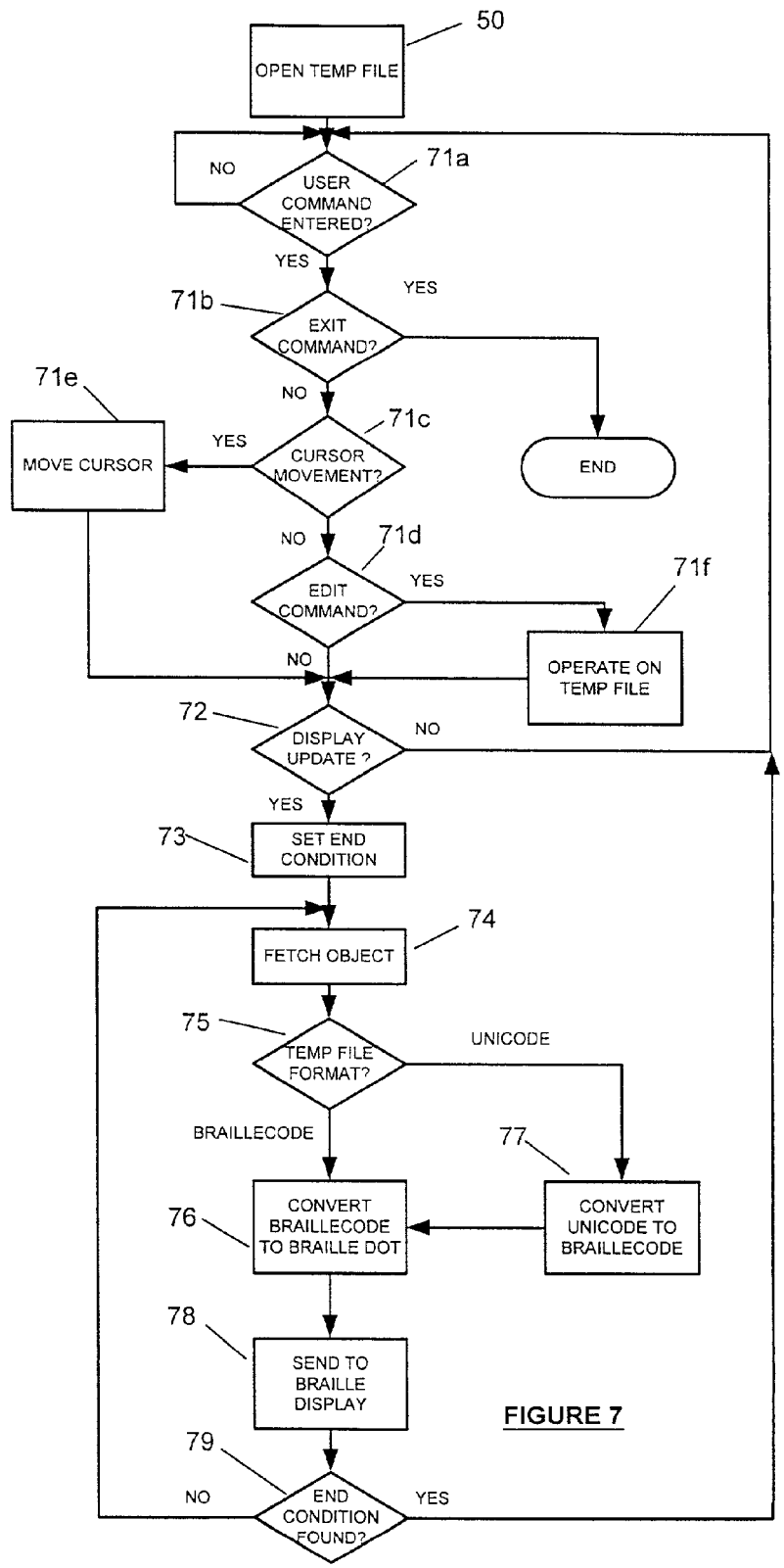
Figure 9B:
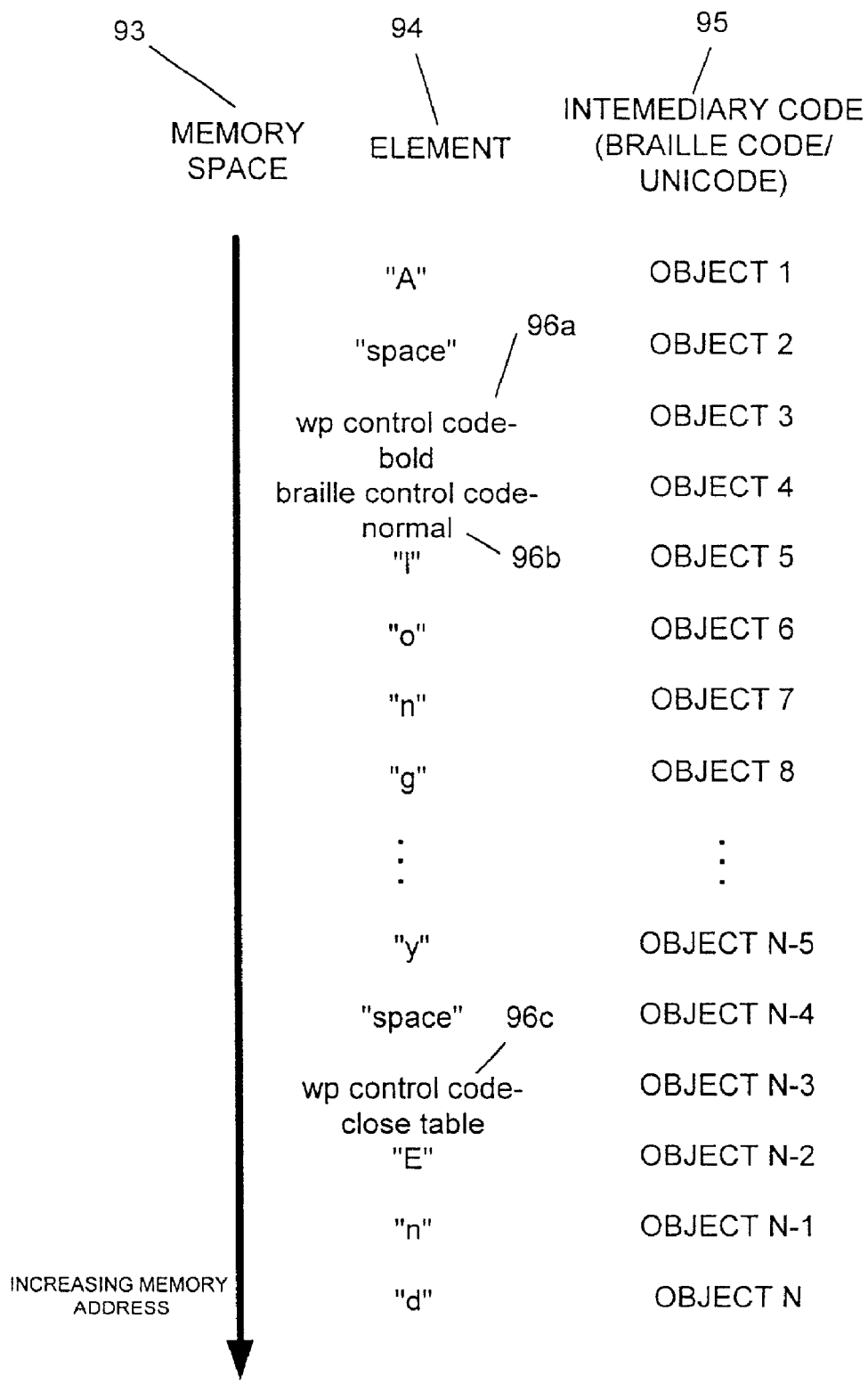
Figure 10:
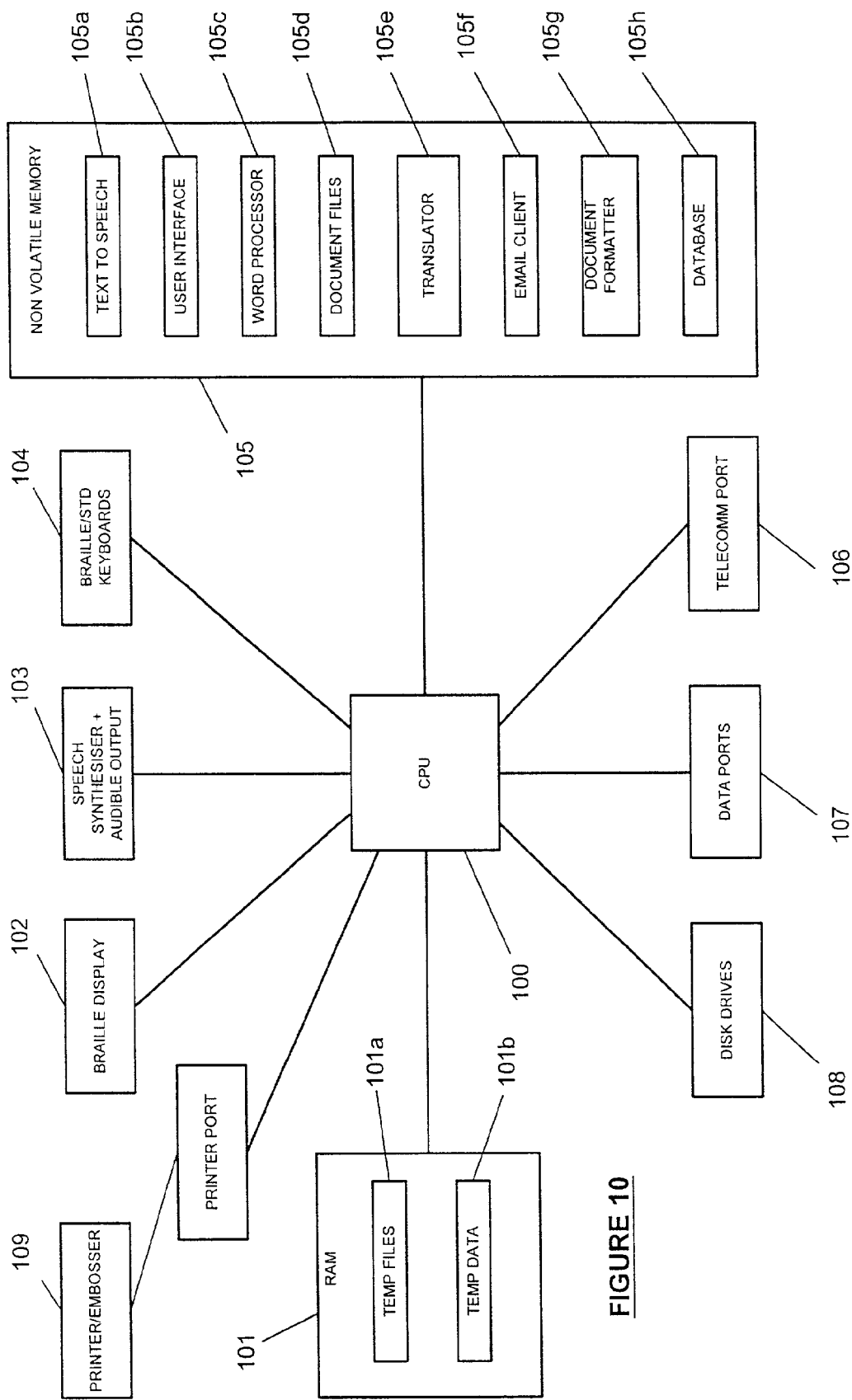
Figure 11:
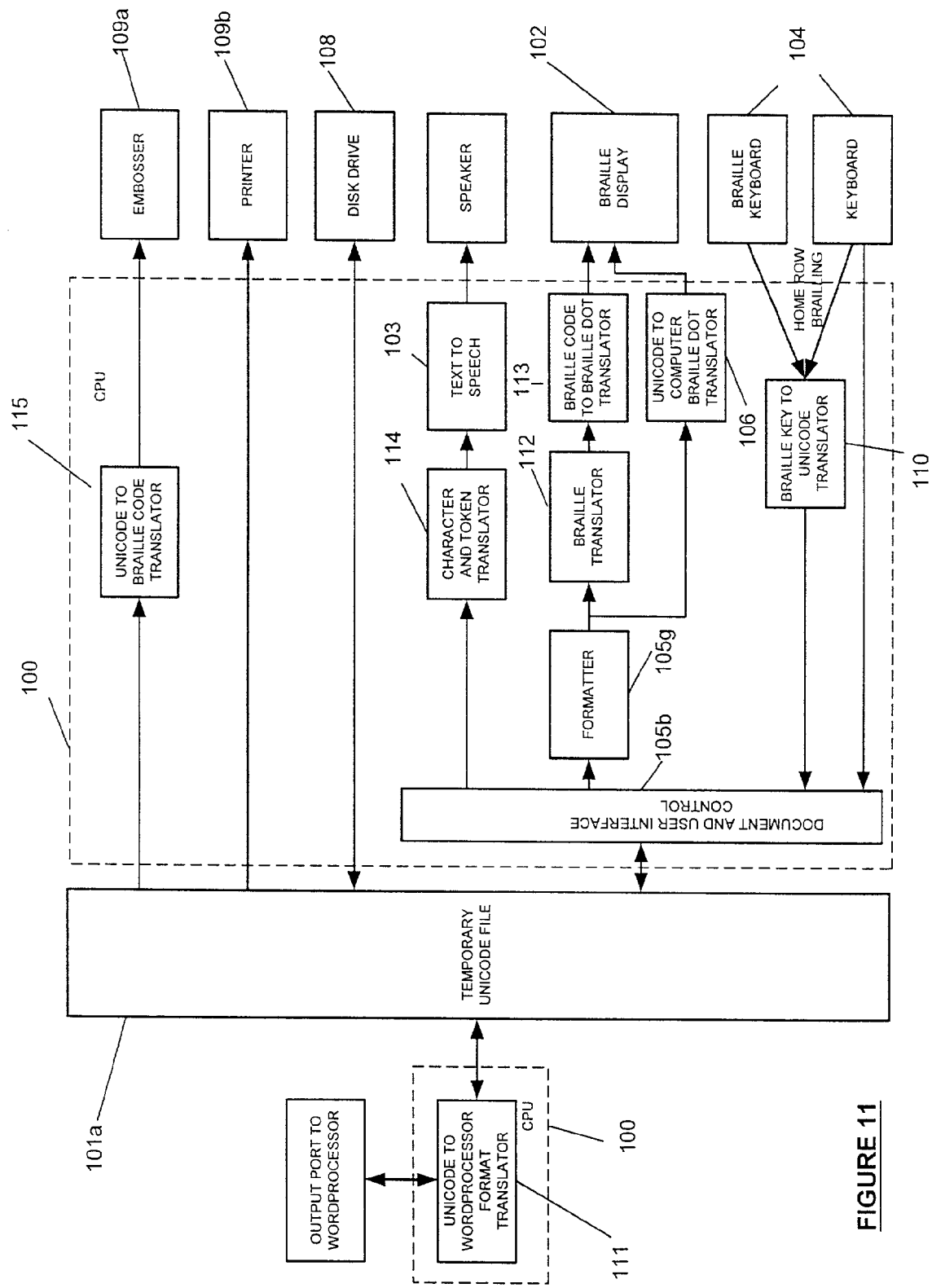
Figure 12:
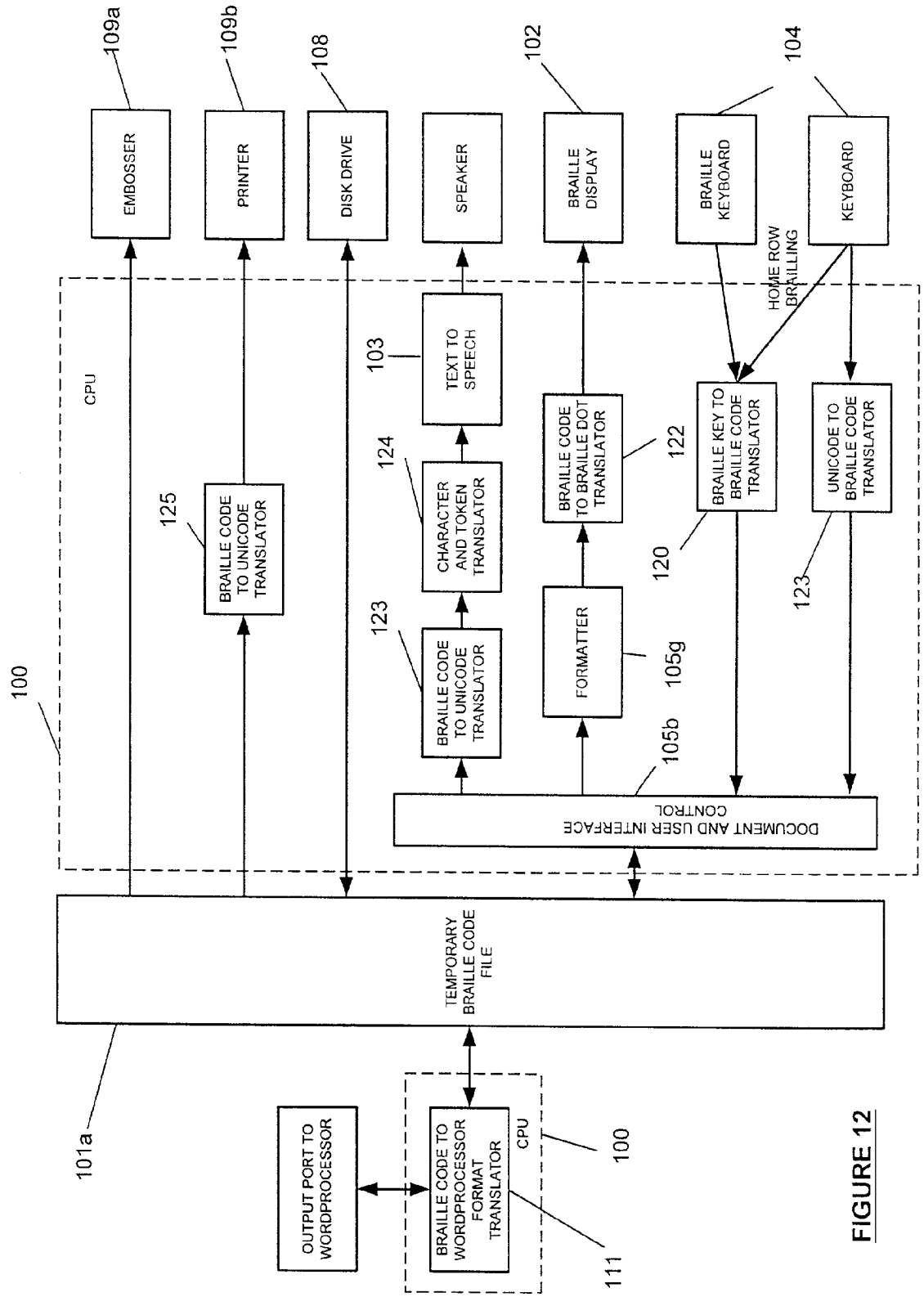

FIGS. 6 to 7 are flow diagrams showing a preferred methods of sending an electronic document to an output device in a Braille environment, FIGS. 9A and 9B show the general structure of a temporary file in an intermediary format, FIG. 10 is a schematic diagram of a Braille notetaker for creating Braille documents and converting electronic documents between Braille and word processing formats, and FIGS. 11 and 12 are schematic diagrams showing further detail of the software implemented on the CPU.

DETAILED DESCRIPTION OF THE PREFERRED EMBODIMENTS

Referring to the drawings it will be appreciated that Braille notetakers according to the invention and their functionality can be implemented in various forms. The following examples are given by way of example only. The various types of Braille and the various formats for storing electronic documents will be known to those skilled in this area of technology and therefore will not be described in detail. Braille code and unicode specify individual characters in a format suitable for computer storage and details of these codes will also be known to the skilled reader.

FIG. 1 shows the general nature of a Braille notetaker 10 according to the invention and its interrelationship with hardware operating in a word processor environment 17. The notetaker 10 assist in creating, editing, embossing, printing and reviewing electronic documents, and converting electronic documents between formats suitable for use in either a Braille 16 or a word processor 17 environment. Typically an electronic document will be a letter, report, or other literary work usually produced on a word processor. The notetaker 10 includes Braille environment input devices 11 for creating new and/or retrieving existing electronic documents, and output devices 12 for rendering electronic documents in either electronic or hardcopy form. The input 11 and output 12 equipment can be mechanical or electronic in nature and may include devices such as Braille keyboards, standard keyboards, speech recognition devices, disk drives, tactile displays, speech synthesisers, printers, embossers and visual display units. The notetaker 10 also includes a computer device 13 which communicates with the input 11 and output 12 devices, and facilitates electronic document conversion between different formats for use in two environments 16, 17. The computer device 13 stores electronic documents as temporary files in an intermediary format, and performs translations of the electronic documents between various file formats as required. The notetaker 10 is adapted to communicate with a standard word processor setup 15, such as word processor software running on a PC, to facilitate transferral of documents between the environments 16, 17. Such communication may take place over the Internet, or by any other networking or interconnection means which will be known to those skilled in this area of technology. Using the arrangement shown in FIG. 1 an electronic document can be created or read in either of the environments, converted into another format compatible for use in the other environment and then transferred to the other environment for use.

The notetaker 10 which forms part of the arrangement depicted in FIG. 1 facilitates conversion of electronic documents between Braille and word processor formats to enable a user to work with the document in both environments. The arrangement further enables information relating to the formatting of the document in each environment to remain independent. Document formatting refers to the manner in which the electronic document is rendered in its destination environment, for example the page and text/Braille layout, character attributes, table arrangements, line/page numbering and the like. This differs from the term electronic document format which relates to particular file format which the computer uses to store the electronic document in memory or on a storage device. The functionality of the notetaker 10 is such that altering the formatting of a document in the Braille environment 16 does not affect the formatting of a document in the word processor environment 17 and vice versa. It should also be noted that the formatting in both environments can be altered if required, such as when a table is edited by removing one row. This enables ink print and embossing versions of the document to remain separate and to be independently edited.

FIG. 2 shows the general nature of a document environment transfer operation which the notetaker 10 facilitates. Initially the notetaker receives 20 an electronic document from a source which can originate from either of the environments 16, 17 in one of a variety of forms. For example the electronic document may be a word processing document which is imported from a word processing environment. Alternatively the document may be a Braille or text document which has been created using a Braille notetaker and subsequently stored on disk. In yet another possible alternative, the notetaker 10 receives the document as it is created using a Braille or standard keyboard provided. As the document is read from a memory source or typed into the notetaker 10, each element of the document, which may be for example a character or formatting code, is saved into a temporary file which stores 21 the document in an intermediary format. The temporary file is a working file which is retained in computer memory and used for document conversion purposes to enable the user to work with the electronic document in either the word processor 17 or Braille environment 16 as required. The document stored in the intermediary format includes information relating to how the document should be rendered in each environment 16, 17.

The user selects the desired output environment and the stored temporary file is then converted 22 from the intermediary format into a suitable format for the selected output environment. For example, should the user wish to export the document to a separate word processor, for example as an e-mail attachment, through a network, or on a portable disk, the notetaker 10 can convert the temporary file to the desired word processor format using a translator. The converted document is then sent 23 to a selected output device for example, a printer or visual display operating in a word processor environment 17, or an embosser or tactile display operating in a Braille environment 16. The document is then rendered on the output device in accordance with the formatting specified for the output environment. Preferably the apparatus operates in a manner such that the transfer between formats is transparent so it appears to the user that only one document is being worked with.

FIG. 3 shows in more detail one aspect of a preferred operation of the notetaker 10. Using word processing software which is implemented on the notetaker 10 an operator creates 30 a new document using a standard keyboard. Braille keyboard, voice recognition system or other data input means. The software is similar in function to a standard word processor with adaptations for use in a Braille environment 16. Typically the document created will be a Braille document although it will be appreciated that the notetaker 10 can also facilitate creation of a standard text document if required. It will be appreciated that in addition, the document being created could be saved in the usual manner on a storage device such as a hard disk or the like in any standard format for later retrieval.

A temporary file is then opened 31 in the intermediary format, either Braille code or unicode, in the notetaker 10 and the operator enters 32 the document elements or objects using the input device 12. These elements or objects will typically be characters forming the content of the document and formatting codes relating to how the document should be rendered in each environment. Separate formatting codes can be entered for rendering the document differently in each environment. For example, a formatting code may be entered to display a particular sentence of the document in underlined text on a standard VDU in a word processing environment. In contrast a separate formatting code could be entered to display the same sentence in Braille without underlining on a tactile display in a Braille environment 16. It will be appreciated that many of the formatting codes for one environment may not be suitable for, or even supported by the other environment. If the end of the input is reached then the process stops otherwise as the elements are entered 32, the notetaker 10 translates 34 them for storage 35 in the temporary file in the intermediary format. Once the document has been entered 33, the temporary file is closed 36 and retained for later use when translation of the document is required for display in a selected environment.

FIG. 4 shows another aspect of a preferred operation wherein a previously created document is selected 40 for conversion by the notetaker 10. The document may originate from either a word processor environment 17 or a Braille environment 16, for example a text document in a word processor format, or a Braille document previously created using the notetaker 10. The notetaker 10 opens 41 a temporary file in the intermediary format and the existing document file. The existing document is opened from its location, directly, for example from a hard disk drive, or alternatively downloaded or otherwise transmitted from a remote location over a network, for example as an e-mail attachment. The notetaker 10 then reads 42 each object from the existing document and converts 44 them for storage 45 in the temporary file in the intermediary format. If at any point the end of the file is reached the process terminates. Once the end of the existing file is reached, both the existing file and the temporary file are closed 46 and the temporary file is retained for conversion.

FIG. 5 shows a preferred method of utilising the temporary file to transfer the electronic document for use in a word processor 17 environment. The temporary file is opened 50 in the intermediary format and the user selects 51 the desired word processor format which is opened. If they wish to export the document for use on a word processor, a word processor format, such as WordPerfect™, is selected 51 and the notetaker 10 opens a suitable export file. The notetaker 10 fetches the temporary file 52 and translates 54 the objects for storage 55 in the export file in the selected word processor format. This process includes extracting and translating 54 the formatting codes relating to how the document should be rendered on the selected word processor. If at any point the end of the file is reached 53 then the process stops and both the export file and temporary file are closed. The export file can then be transferred, for example as an e-mail attachment, to word processing equipment operating in the word processor environment 17, or alternatively saved onto disk for later retrieval. The document may then be displayed, edited, saved and printed in the usual manner using the word processor. Further, the document may be subsequently transferred back to the notetaker 10 for conversion into a suitable format for use in the Braille environment 16 if required.

Figure 8:
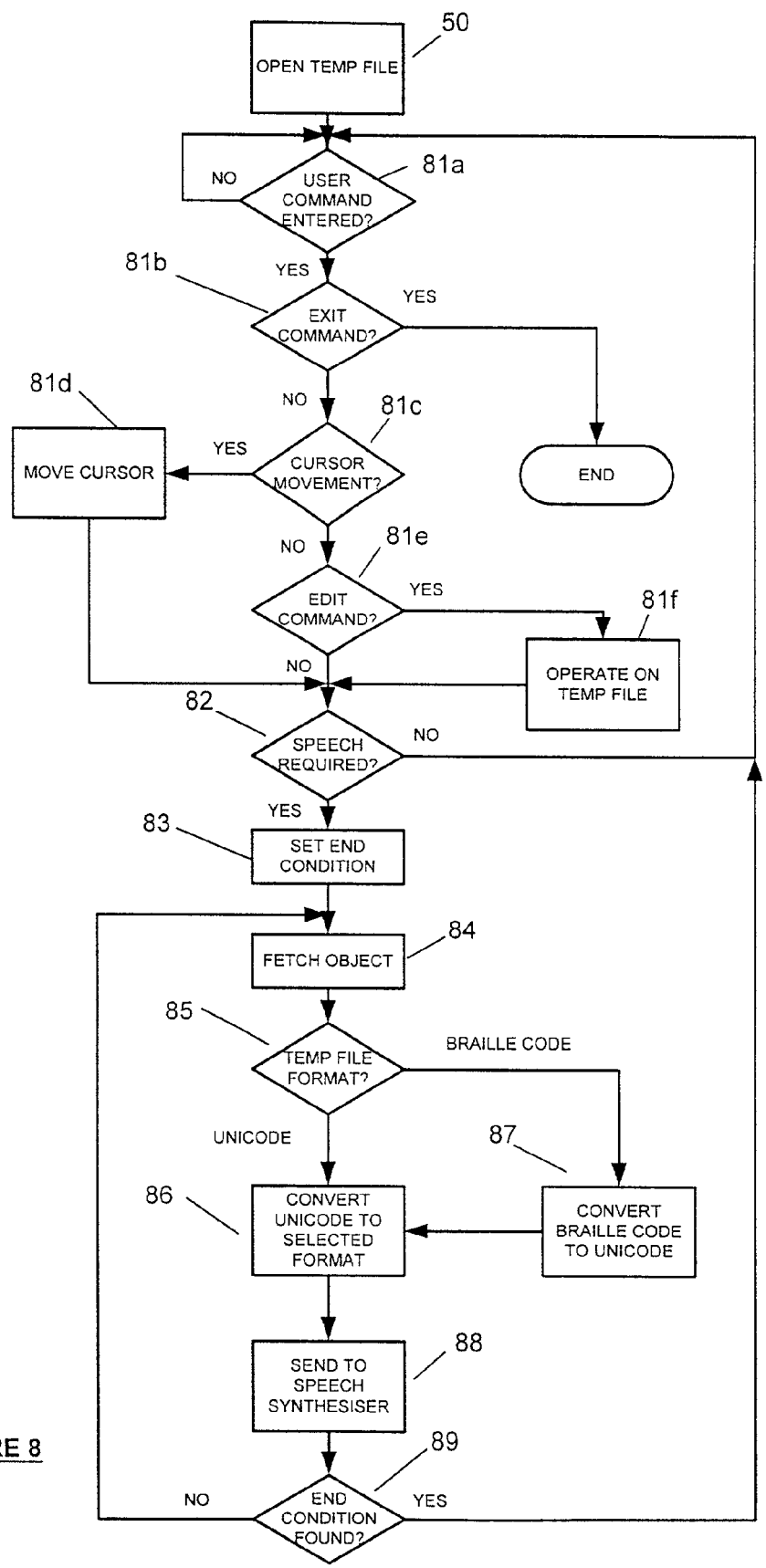

Alternatively FIGS. 6 to 8 show preferred methods of utilising the temporary file for use in a Braille environment 16. For example the user may want to edit the document using an output device which can either be an integral component of the notetaker 10 or peripheral devices. More particularly, FIG. 6 shows the process for producing a hardcopy of the document by either an embosser or printer, or for saving the document on a disk drive for later use. Similarly, FIGS. 7 and 8 show the process for enabling editing or reviewing of the document by either a Braille display or a text to speech audio device respectively. It should be noted that the flow diagrams have been separated for clarity. In each case the temporary file is converted, if necessary, to a suitable format which is compatible with the desired output device.

Referring to FIG. 6 the temporary file is opened and then the user selects 56 what output device the document should be sent to. If user wishes to produce an embossed hardcopy of the document, the notetaker 10 first determines 57a the format of the temporary file. If the temporary file is in Braille code format which can be read by the embosser, then the entire file is sent 62 directly to the embosser where the document is embossed 67. Alternatively if the temporary file is in unicode format, the temporary file is first converted 58 from unicode to Braille code and the converted file is then sent 63 to the embosser where the document is embossed 67.

Alternatively, if the user wishes to produce a hardcopy text version of the electronic document, the notetaker 10 first determines the format 57b of the temporary file. A temporary file which is in unicode format can be read by the printer and therefore in this case the temporary file is sent directly 65 to the printer where the document is printed 68. Otherwise if the temporary file is in Braille code format, the notetaker 10 first converts 61 the Braille code to unicode and then sends 66 the converted unicode file to the printer to print 68 to a text version of the document. If the electronic document is to be saved on a disk drive associated with the notetaker 10 for later use then the temporary file is sent 59 directly to the disk drive where it is saved 64 on a CDRom, floppy disk, hard disk or the like.

Referring to FIG. 7, if the user wishes to edit the document using a tactile Braille display then an edit mode of the notetaker 10 is initiated and the temporary file is opened 50. A range of options 71b–71f relating to editing are available to the user and are detected by the notetaker 10 as the appropriate commands are entered 71a into the notetaker 10. For example the user is able to move 71c the cursor to the desired location in the temporary file relating to the portion they wish to edit. A desired editing command can be entered 71a and the notetaker 10 performs the corresponding action, in this case performing the edit 71f, on the temporary file. The user can also view the temporary file on the Braille display 72 if required and select an end condition 73 stipulating what portion of the file is to be sent to the display, for example a word, sentence, paragraph or the like. The notetaker 10 then fetches 74 the next object from the temporary file. If the temporary file format is in Braille code 75 then the object is sent directly 76 to a Braille code to Braille dot translator. If the temporary file format is unicode the notetaker 10 first converts 77 the unicode object into a Braille code object prior to sending 76 the object to the Braille dot translator. Once translated the Braille dot system is sent 78 to the Braille display. The next object is then fetched 74 from the temporary file and the process is continued until the end condition is reached 79, for example the end of a sentence.

Should the user wish to edit the document using a text to speech synthesiser then a similarly process is carried out as shown in FIG. 8. Again an edit mode of the notetaker 10 is initiated and the temporary file is opened 50. A range of options 81b–81f relating to editing are available to the user and are detected by notetaker 10 as the appropriate commands are entered 81a on the notetaker 10. For example the user is able to move 81c the cursor to the desired location in the temporary file relating to the portion they wish to edit. A desired editing command can be entered 81e and the notetaker 10 performs the corresponding action on the temporary file 81f. The user can also listen 82 to the temporary file using the text to speech hardware if required and select 83 an end condition stipulating what portion of the file is to be output. The notetaker 10 then fetches 84 the next object from the temporary file. If the temporary file format is unicode 85 then the object is converted 86 from unicode to a user selected format. If the temporary file format is Braillecode the notetaker 10 first converts 87 the Braille code object into a unicode object prior to sending 88 the object to the converter. Once translated the object is sent 88 to the speech synthesiser. The next object is then fetched 84 from the temporary file and the process is continued until the end condition is reached 89, for example the end of a sentence at which point the speech synthesiser renders the portion of the file in an audible manner.

FIG. 9A shows an example of a preferred structure of the temporary file. The temporary file comprises two files 90, 91 which are read as one contiguous file for the purposes of translation. The entire file is split into two portions in accordance with the current cursor location, with one file containing elements occurring before the cursor 92 and the other file containing elements which occur after the cursor 92. This structure assists editing of the file, whereby any editing of the elements in the file which occur before the cursor 92 are changed in the first file 90 and any editing which affects elements which occur after the cursor 92 are changed in the second file 91. The user can add or remove text from the document at any point as required. This structure avoids the need for objects to be shifted to make room, or remove empty space in the file as addition/deletions are made to the file, and as a result improves file processing speed.

FIG. 9B shows an example of the elements stored in the temporary file. Elements or objects which are characters are termed literals and elements or objects which are formatting codes can be referred to as tokens. Each object or element of the file is stored sequentially in memory 93 in the selected format, for example as a unicode object or a Braille code object, which relates directly to either a literal or token 94. Each object 95 which relates to a token also includes a label 96a–96c which indicates whether the object 95 relates to formatting in a Braille environment 16 or formatting in a word processor environment 17. Several token objects, eg 96a, 96b may be specified for each individual or block of literal objects, each token indicating one of a range of formatting codes relating to one of the environments.

FIG. 10 is a block diagram showing components of the notetaker 10 which assist implementation of document conversion between formats for use in each environment. Details of components which carry out other standard functions of the notetaker 10 not related to document conversion will not be described here. The notetaker 10 includes a CPU 100 which access a RAM 101 in which the temporary working file 101a and other temporary data 101b utilised during document conversion is stored. The CPU 100 also implements the various programs which form part of the document conversion and rendering process. The various software 105a–105h programs are stored in non volatile memory 105, and include a text to speech synthesiser 105a, user interface 105b adapted for use by visually impaired operators, word processor 105c adapted for use with both Braille and text documents, document files 105d, translators 105e for converting documents between various storage formats, e-mail client 105f, document format translators 105g for converting electronic documents into the required output layout, and a database 105h which contains information relating to the various codes and formats utilised for document conversion. The translators 105c are a range of programs carrying out various translation functions and are shown individually in FIGS. 10 and 11.

The notetaker 10 further includes various input devices 11 used to operate the apparatus including Braille and/or standard keyboards 104, storage devices 108 such as hard drives, floppy drives, CDROMs and the like. The notetaker 10 transfers information between other compatible hardware in both Braille and word processor environments 16, 17 via various communications ports. Data ports 107 such as the standard serial and parallel ports typically found on computer hardware are provided, for communication over local area networks, along with telecommunications ports 106 for transfer of information via a modem or the like over the Internet and other wide are networks. Output devices for rendering Braille and text documents are also provided including a refreshable tactile Braille display 102, a speech synthesiser and speaker 103 arrangement and a visual display, if required. The notetaker 10 can also be adapted for operation with peripheral input and output equipment, for example a printer and/or embosser 109 to produce hard copies of Braille/text documents.

FIGS. 11 and 12 show in more detail the software functions implemented by the CPU 100 and the interrelationships between the software and the input/output devices. FIG. 10 shows an implementation in which the temporary file is saved in unicode format whereas FIG. 11 shows an implementation where the temporary file is saved in Braille code format. Referring to FIG. 10, either a Braille or text document can be input into the notetaker 10 from a storage device such as the disk drive 108 or from the Braille or standard keyboards 104. If the input originates from the standard keyboard 104 or the disk drive 108, each element, such as a character or format code, or an entire file in the case of an existing document is passed directly to a document and user interface control 105a. If the input originates from the Braille keyboard 104, a translator 110 is first used to convert the Grade 1, Grade 2 or computer Braille input from the 6 or 8 key device into unicode. Alternatively home row brailling can be used whereby 6 or 8 keys on the standard keyboard are nominated as Braille input keys, and Braille characters are entered in the normal manner using these keys. Typically the keys "asdf" and "jkl:" on the standard keyboard are nominated for use in home row brailling. If standard text input originates from the standard keyboard this is passed directly as unicode to the user interface controller 105b.

The document and user interface controller 105b shown in FIG. 10 enables various user and hardware preferences to be set in relation to use and rendering of an electronic document. For example, the user interface determines whether the output should be in a 18 or 32 cell tactile display format in accordance with the hardware being used, the nature in which text to speech synthesiser should indicate punctuation, numbers and character attributes, and various other user preferences. Once the document and user interface controller 105*b* parses the unicode input and inserts any further formatting codes as required the data is sent to memory 101 for storing in a temporary file 101*a* in the intermediary format, in this case in unicode format. The stored document includes information relating to the content of the document and also the formatting of the document in each environment, for example the layout and character attributes. Once saved in the intermediary format, the notetaker 10 can be used to edit the content of the electronic document, and the formatting the document assumes in each environment prior to translation.

The temporary file shown in FIG. 10 enables conversion of the electronic document for use in either of the environments as required. The notetaker 10 includes unicode to word processor format translation software 111 which is implemented on the CPU 100 to convert the electronic document into a suitable format, such as Microsoft Word™, WordPerfect™, ASCII, RTF, or the like, for use on a desired word processor. Once translated the document can be exported to another machine executing the word processor, for example by e-mail, disk, network connection or the like. From there the document can be edited, printed or saved in the usual manner on the other machine using the word processor. Similarly, a document from such a word processor can be imported into the notetaker 10 by way of an e-mail attachment, disk, network connection or the like and then converted using the format translator 111 into unicode for saving in a temporary file for subsequent use in the Braille environment 16 using the notetaker 10.

An electronic document saved as a temporary file in the unicode intermediary format can also be converted for use by Braille equipment, such as the notetaker 10 itself, peripheral equipment or other compatible Braille equipment. Where the document is to be output to a speech synthesiser 103 or Braille display, the electronic document is first read from the temporary file 101*a* and then passed by the document and user interface controller software 100 where various Braille output preferences are specified.

To send the output to the speech synthesiser 103 the temporary file information is retrieved object by object until the required amount of the file has been accessed, for example a whole sentence or paragraph, according to how much of the document the user wishes to review at one time. Each object is then sent to a translator program 114 which translates stored objects into individual characters and tokens which can be streamed to and interpreted by the synthesiser 73 to produce the audible output. Alternatively the document can be sent to a refreshable tactile Braille display 102 so the document can be read directly on the 18 or 32 cell display provided by the notetaker 10. In this case the required amount of information retrieved from the temporary file is passed to a formatter 105*g* which extracts formatting information from both the temporary file and user interface controller 105*b* to determine an appropriate format for the information being displayed. In particular the document formatter 105*g* program processes the electronic document to set up the required layout of the document in accord with Braille document conventions, the nature of the output device and any other formatting requirements specified by the temporary file itself. For example, the document formatter 105*g* arranges the document content into a 40 symbol per line by 25 line per page layout which is usual for Braille documents. The formatter 105*g* also extracts various other formatting codes, such as character attributes pertaining to Braille document formatting. Where Grade 1 or Grade 2 Braille is required a Braille translator 102 turns the object into Braille code and a Braille code to Braille dot translator 103 turns the object into a corresponding 2 by 3 dot array used to represent the Braille character. To render computer Braille, the output of the formatter 105*g* can also be passed to a unicode to computer Braille dot translator 106 which turns each character element of the temporary file into a 2 by 4 dot array each of which is passe to the Braille display 102 to enable review of the document by a visually impaired operator. If a embossed hardcopy of the document is required the CPU 100 implements a unicode to Braille code translator 115 which transforms the unicode into a format which can be sent to the embosser 109*a* to produce the hardcopy. Alternatively a hard copy text version of the document can be printed by sending the intermediary file directly to a printer 109*b* connected to the notetaker 10. A copy of the electronic document can also be saved for later use by transferring the unicode file directly to a storage device 108 such as a hard disk, floppy disk, CDROM or the like.

FIG. 12 shows an alternative process implemented by the CPU 100 for facilitating environment conversion of an electronic document using a temporary file saved in a Braille code format. The general interrelationship and functionality offered by the programs used to carry out the conversion processes in relation to a Braille code intermediary format are similar to those for the unicode format described in FIG. 10 and therefore only the differences will be described here. Input from the standard keyboard is passed to a unicode to Braille code translator 123 before the input is passed to the user interface controller 105*b*. Home row Brailling input is passed to a Braille key to Braille code translator program 120, while standard keyboard input is passed to a unicode to Braille code translator 123 prior to sending the input to the user interface controller 105*b*. To emboss a document the temporary file can be sent directly to the embosser 109*a*. A Braille code to unicode translator 125 is provided by the CPU 100 function to convert the temporary file into a format suitable for printing a text version of the document on a standard printer 109*b*. The Braille code temporary file can be saved directly to a storage device 108 if required. If the document needs to be output to the Braille display, a Braille code to Braille dot 122 translator converts objects as required.

What is claimed is:

1. A method for converting an electronic document interchangeably between a format for use in a Braille environment and a format for use in a word processor environment including:
   receiving input in a first of the environments specifying the electronic document,
   storing the electronic document in an intermediary file format, which preserves the content of the document including, but not limited to, information content, document presentation content, and content conditional on the environment in which it is being used, and
   converting the electronic document from the intermediary file format into a destination file format adapted for editing in the second of the environments, including that content which is conditional on that environment.

2. A method according to claim 1 further including transferring the document to an apparatus adapted for operation in the second of the environments.

3. A method according to claim 1 further including rendering the electronic document in the second of the environments in accordance with the specified formatting.

4. A method according to claim 3 further including editing the electronic document formatting for one of the environments.

5. A method according to claim 4 wherein editing the electronic document in one of the environments does not affect formatting of the rendered electronic document in the other of the environments.

6. A method according to claim 1 wherein the input is received in a Braille environment from a Braille keyboard, standard keyboard or a stored computer file.

7. A method according to claim 6 wherein the destination format is adapted for use in a word processor environment.

8. A method according to claim 1 wherein the input is received in a word processor environment from a standard keyboard or a stored computer file.

9. A method according to claim 8 wherein the destination format is adapted for use in a Braille environment.

10. A method according to claim 7 wherein the destination format is compatible with word processing equipment to assist in creating, editing, rendering and/or printing a text document.

11. A method according to claim 9 wherein the destination format is compatible with Braille equipment to assist in creating, editing, rendering and/or embossing a Braille document.

12. A method according to claim 9 wherein the destination format for use in a Braille environment specifies the electronic document for rendering in grade 1, 2 or computer Braille.

13. A method according to claim 7 wherein the destination format for use in a word processor environment specifies the electronic document for presentation on a word processor.

14. A method according to claim 1 further including transmitting the document to another computer.

15. A method according to claim 1 wherein the electronic document formatting is specified by codes indicating page layout, character attributes and the like.

16. A method for converting an electronic document interchangeably between a format for use in a Braille environment and a format for use in a word processor environment including:
 receiving input specifying an electronic document from an input device operating in the Braille environment,
 storing the electronic document in an intermediary file format which preserves the content of the document, including but not limited to, information content, document presentation content, and content conditional on the environment in which it is being used,
 converting the electronic document from the intermediary file format into a word processor file format adapted for storing, reviewing or editing in a word processor environment, including that content which is conditional on that environment,
 and transferring the electronic document in the word processor format to equipment operating in the word processor environment,
 wherein the document formatting for each environment is stored independently in the intermediary format to enable independent editing of the document formatting for each environment.

17. A method for converting an electronic document interchangeably between a format for use in a Braille environment and a format for use in a word processor environment including:
 receiving input specifying an electronic document from an input device operating in the word processor environment,
 storing the electronic document in an intermediary file format which preserves the content of the document, including but not limited to, information content, document presentation content, and content conditional on the environment in which it is being used,
 converting the electronic document from the intermediary file format into a Braille file format adapted for storing, reviewing or editing in a Braille environment, including that content which is conditional on that environment,
 and transferring the electronic document in the Braille format to equipment operating in the Braille environment,
 wherein the document formatting for each environment is stored independently in the intermediary format to enable independent editing of the document formatting for each environment.

18. An apparatus which enables use of an electronic document in a Braille and a word processor environment including:
 at least one document input device in a first of the environments for entering an electronic document into the apparatus,
 a storage device for storing the electronic document in an intermediary file format which preserves the content of the document, including but not limited to, information content, document presentation content and content conditional on the environment in which it is being used, and
 a translator for converting the electronic document from the intermediary file format into a destination file format adapted for editing in the second of the environments including that content which is conditional on that environment.

19. An apparatus according to claim 18 further including an input device for editing the electronic document formatting for each of the environments.

20. An apparatus according to one of claims 18 wherein editing the document formatting for one of the environments does not affect document formatting for the other environment.

21. An apparatus according to claim 18 further including a telecommunications port for transferring the document to another apparatus.

22. An apparatus according to claim 18 wherein the second of the environments is a word processor environment and the destination format is adapted for compatibility with word processor equipment.

23. An apparatus according to claim 18 wherein the second of the environments is a Braille environment and the destination format is adapted for compatibility with Braille equipment.

24. An apparatus according to claim 22 wherein the format for use in a Braille environment specifies information for rendering the document in grade 1, 2 or computer Braille.

25. An apparatus according to claim 18 wherein the document formatting is specified by codes indicating page layout, character attributes and the like.

26. An apparatus according to claim 18 further including an output device for rendering the electronic document in a visual, tactile or audible manner.

27. An apparatus which enables use of an electronic document interchangeably between a Braille and a word processor environment including:
 at least one document input device operating in the Braille environment for entering an electronic document into the apparatus, a storage device for storing the electronic document in an intermediary file format which preserves the content of the document, including but not limited to, information content, document presentation content, and content conditional on the environment in which it is being used, a translator for converting the electronic document from the intermediary file format into a word processor file format compatible for use with word processor equipment operating in the word processor environment, said word processor file format adapted for storing, reviewing, or editing in the word processor environment, including, that content which is conditional on that environment, a communication device for transferring the document between the storage device and the word processor equipment, and an editing device for editing the document formatting for each of the environments, wherein the document formatting for each environment is stored independently in the intermediary file format to enable independent editing of the document formatting for each environment.

28. An apparatus which enables use of an electronic document interchangeably between a Braille and a word processor environment including:

at least one document input device operating in the word processor environment for entering an electronic document into the apparatus, a storage device for storing the electronic document in an intermediary file format which preserves the content of the document, including but not limited to, information content, document presentation content, and content conditional on the environment in which it is being used, a translator for converting the electronic document from the intermediary file format into a Braille file format compatible for use with Braille equipment operating in a Braille environment said Braille file format adapted for storing, reviewing or editing in the Braille environment, including that content which is conditional on that environment, a communication device for transferring the document between the storage device and the Braille equipment, and an editing device for editing the document formatting for each of the environments, wherein the document formatting for each environment is stored independently in the intermediary format to enable independent editing of the document formatting for each environment.

29. A device for use of an electronic document between at least two environments, at least one of said environments being a Braille environment or a word processor environment including:

means for receiving input, in either of the environments, which specifies the electronic document;

means for storing the document electronically in an intermediary file format, which preserves all the content of the document including but not limited to, information content, document presentation content, and content conditional on the environment in which it is being used;

means for converting the document from the intermediary file format into a destination file format adapted for storing, reviewing or editing in one of the environments, including that content which is conditional on that environment.

30. A device as claimed in claim 29 further comprising means for reviewing the document content in either of the environments, including that content which is conditional on either environment.

31. A device as claimed in claim 30 further comprising means for editing the document content, in either of the environments, including that content which is conditional on either environment.

32. A device for use of an electronic document interchangeably between at least two environments, at least one of said environments being a Braille environment or a word processor environment including:

means for receiving input, in either of the environments, which specifies the electronic document;

means for storing the document electronically in an intermediary file format, which preserves all the content of the document including but not limited to, information content, document presentation content, and content conditional on the environment in which it is being used;

means for converting the document from the intermediary file format into a destination file format adapted for storing, reviewing or editing in one of the environments, including that content which is conditional on that environment.

33. A device for specifying an electronic document for use in a Braille environment and for use in a word processor environment including:

means for receiving input, in either of the environments, which specifies the document, means for storing the document electronically in an intermediary file format, which preserves all the content of the document as independent objects, means for reviewing the document content in either of the environments, including that content which is conditional on either environment, means for editing the document content, in either of the environments, including that content which is conditional on either environment, means for converting the document from the intermediary file format into a destination file format adapted for storing, reviewing or editing in only one of the environments, wherein the intermediary file preserves and specifies the document including but not limited to, information content, document presentation content, and content conditional on the environment in which it is being used.

* * * * *